US009479400B2

(12) United States Patent
Chen et al.

(10) Patent No.: US 9,479,400 B2
(45) Date of Patent: *Oct. 25, 2016

(54) SERVLET API AND METHOD FOR XMPP PROTOCOL

(71) Applicant: Cisco Technology, Inc., San Jose, CA (US)

(72) Inventors: Wei Chen, Saratoga, CA (US); Xiaopu Zhu, Beijing (CN); Zhiyu Liu, Beijing (CN); Pubing Zhang, Beijing (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,883

(22) Filed: Dec. 14, 2015

(65) Prior Publication Data

US 2016/0204993 A1    Jul. 14, 2016

Related U.S. Application Data

(63) Continuation of application No. 13/088,394, filed on Apr. 17, 2011, now Pat. No. 9,215,079.

(60) Provisional application No. 61/325,348, filed on Apr. 18, 2010.

(51) Int. Cl.
*G06F 15/173* (2006.01)
*H04L 12/24* (2006.01)
*H04L 29/08* (2006.01)

(52) U.S. Cl.
CPC ............ *H04L 41/20* (2013.01); *H04L 67/142* (2013.01)

(58) Field of Classification Search
CPC ...... H04L 12/581; H04L 51/04; H04L 67/02
USPC ......................................................... 709/223
See application file for complete search history.

(56) References Cited

U.S. PATENT DOCUMENTS

| 6,922,400 | B2 * | 7/2005 | Iwakuni | H04H 20/16 370/270 |
| 9,215,079 | B2 * | 12/2015 | Chen | H04L 12/1813 |
| 2002/0198943 | A1 * | 12/2002 | Zhuang | H04L 29/06 709/206 |
| 2007/0016680 | A1 * | 1/2007 | Burd | H04L 67/104 709/227 |

* cited by examiner

*Primary Examiner* — Jerry Dennison

(57) ABSTRACT

A communication system and method include a server hosting an interactive voice response or self-help application in a virtual machine. In order to leverage the advantages and facilities of the servlet model, a XMPP (Extensible Messaging and Presence Protocol) servlet container is provided for the server so that the communication application can be programmed with objects defined by an XMPP servlet API, as well as such as HTTP and SIP servlets, in order to service an XMPP client. In addition to the generic class objects of the Java servlet model, the API also provides a set of XMPP-specific class objects. The XMPP servlet container includes a network point at a transport level for handling network connections, an XMPP service layer for managing XMPP sessions and streams, and an application layer for managing XMPP stanzas.

16 Claims, 6 Drawing Sheets

SYSTEM ARCHITECTURE

SYSTEM ARCHITECTURE

SERVLET INTERFACE

| <<interface>> |
| :--- |
| XMPPServlet |
| - serialVersionUID : long = -4337031188382489354 1L<br>+ XMPP_FACTORY : String = "com.voxeo.servletxmpp.XMFFactory"<br>+ SESSIONUTIL : String = "com.voxeo.servlet.xmpp.SessionUtil" |
| + service(req : ServletReguest, res : ServletResponse) : void<br># doRequest(req : XmppServletRequest) : void<br># doResponse(resp : XmppServletResponse) : void<br># doMessage(req : InstantMessage) : void<br># doPresence(req : PresenceMessage) : void<br># doIQRequest(req : IQRequest) : void<br># doIQResponse(req : IQResponse) : void<br>~ send(stanza : XmppServletMessage) : void<br>+ log(s : String) : void<br>+ log(s : String, throwable : Throwable) : void |

XMPP SERVLET INTERFACE

*FIG. 5*

REQUEST & RESPONSE

SERVLET API AND METHOD FOR XMPP PROTOCOL

CROSS-REFERENCE TO RELATED APPLICATIONS

This application is a continuation of U.S. patent application Ser. No. 13/088,394 titled "SERVLET API AND METHOD FOR XMPP PROTOCOL", filed on Apr. 17, 2011, which claims the benefit of U.S. provisional patent application No. 61/325,348, titled "SERVLET API AND METHOD FOR XMPP PROTOCOL", and filed on Apr. 18, 2010, the specifications of each of which are incorporated herein in their entirety by reference.

BACKGROUND OF THE INVENTION

1. Field of the Art

The present invention relates to telecommunication and a networked computer telephony system including the Internet and the Public Switched Telephone System, and more particularly to a system and method for deploying XMPP-compliant applications built on an XMPP API according to the Java servlet model.

2. Discussion of the State of the Art

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP (Transmission Control Protocol/Internet Protocol) suite. Specifically, voice and other multimedia information are transported on the Internet under the VoIP (Voice-over-IP) protocol.

The integration of the PSTN and the IP networks allows for greater facility in automation of voice applications by leveraging the inherent routing flexibility and computing accessibility in the IP networks.

An example platform for easy deployment of telephony applications is described in U.S. Pat. No. 6,922,411, which entire disclosure is incorporated herein by reference. Essentially, a networked telephony system allows users to deploy on the Internet computer telephony applications associated with designated telephone numbers. The telephony application is easily created by a user in XML (Extended Markup Language) with predefined telephony XML tags (e.g. VoiceXML) and easily deployed on a website. The telephony XML tags include those for call control and media manipulation. A call to anyone of these designated telephone numbers may originate from anyone of the networked telephone system such as the PSTN (Public Switched Telephone System), a wireless network, or the Internet. The call is received by an application gateway center (AGC) installed on the Internet. Analogous to a web browser, the AGC provides facility for retrieving the associated XML application from its website and processing the call accordingly.

This type of telephony platform allows very powerful yet simple telephony applications to be built and deployed on the Internet. The following are some examples of the telephony applications deployed on this platform. A "find me, follow me" application sequentially calls a series of telephone numbers as specified by a user until one of the numbers answers and then connects the call. Otherwise, it does something else such as takes a message or sends e-mail or sends the call to a call center, etc. In another example, a telephonic polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, and so forth. In another example, a help desk application plays a series of interactive voice prompts/messages in response to the called party's responses and possibly connects the call to a live agent as one option, etc. In yet another example, a stock or bank Transactions application plays a series of interactive voice prompts/messages in response to the called party's responses and conducts appropriate transactions with a backend database or web application, etc.

The latter examples are generally referred to as self-help applications. In the voice context, a self-help application is referred to as IVR. IVR refers to Interactive Voice Response and is a technology that automates interaction with telephone callers. Enterprises are increasingly turning to IVR to reduce the cost of common sales, service, collections, inquiry and support calls to and from their company.

As described earlier, an IVR is a specific example of a self-help application in which users can help themselves by interacting with the application to perform some tasks. A traditional IVR only allows users to interact with it through a voice channel. Similarly, a web bot is a specific example of a self-help application that allows users to perform tasks using a text channel.

One example of the platform is to host an IVR application that interacts with voice, text messaging and other clients in a multi-channel environment.

Text messaging has become very popular with the proliferation of portable phones and computing devices. Text messaging is a form of communication by exchange of text messages from point to point or point to multiple points. Most common forms of text messaging are email, web blog and instant messaging. Instant messaging ("IM") exchanges messages almost in real-time. There are a number of proprietary instant messaging networks, each providing IM service to each own clients using a native protocol. An open source IM Network also exists and uses the XMPP protocol.

XMPP refers to Extensible Messaging and Presence Protocol and it is a set of open XML technologies for presence and real-time communication developed by the Jabber open-source community in 1999.

An XMPP service for a Java application has been implemented in Google Talk™ as an XMPP extensions, a chat application from Google, Inc., California, USA, to make it XMPP compatible. This is accomplished by wrapping XMPP messages as MIME (Multipurpose Internet Mail Extensions) messages and putting the MIME messages inside a HTTP messages. So, from an application point of view, it actually receives a HTTP message and has to use a Google-specific API to extract the XMPP messages out of the MIME messages inside the HTTP message. This approach is not fully compliant with the standards-based Java servlet model.

It is desirable to have a self-help application that allows interaction with text messaging clients. It is therefore desirable to have a converged communication application platform, which allows applications to be easily developed and executed on the application server-side, similar to HTTP servlets for web clients or Session Initiation Protocol (SIP) servlets for voice clients.

SUMMARY OF THE INVENTION

A communication system and method include a server hosting an interactive v01ce response or self-help application in a Java virtual machine. In order to leverage the advantages and facilities of the Java servlet model, a Java XMPP (Extensible Messaging and Presence Protocol) servlet container is provided for the server so that the communication application can be programmed with objects defined by an XMPP servlet API, as well as objects defined by the standards-based Java EE platform such as HTTP and SIP servlets, in order to service an XMPP client.

In addition to the generic class objects of the Java servlet model, the API also provides a set of XMPP-specific class objects.

The Java XMPP servlet container includes a network point at a transport level for handling network connections, an XMPP service layer for managing XMPP sessions and streams, and an application layer for managing XMPP stanzas.

The application is allowed to be programmed with the Java XMPP servlet API in order to leverage the advantages and facilities of the Java servlet model, so that programming need not be concerned with low-level transport and connection functions and instead focus on business logic.

The architecture of the Java XMPP servlet container is such that the negotiation of streams terminates at the XMPP service layer and not at the application layer. This allows portability of the applications from one server to another server within a cloud of computing resources.

Additional objects, features and advantages of the present invention will be understood from the following description of its preferred embodiments, which description should be taken in conjunction with the accompanying drawings.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 5 illustrates in more detail the XMPP Servlet Interface shown in FIG. 4.

DETAILED DESCRIPTION

Figure 1:
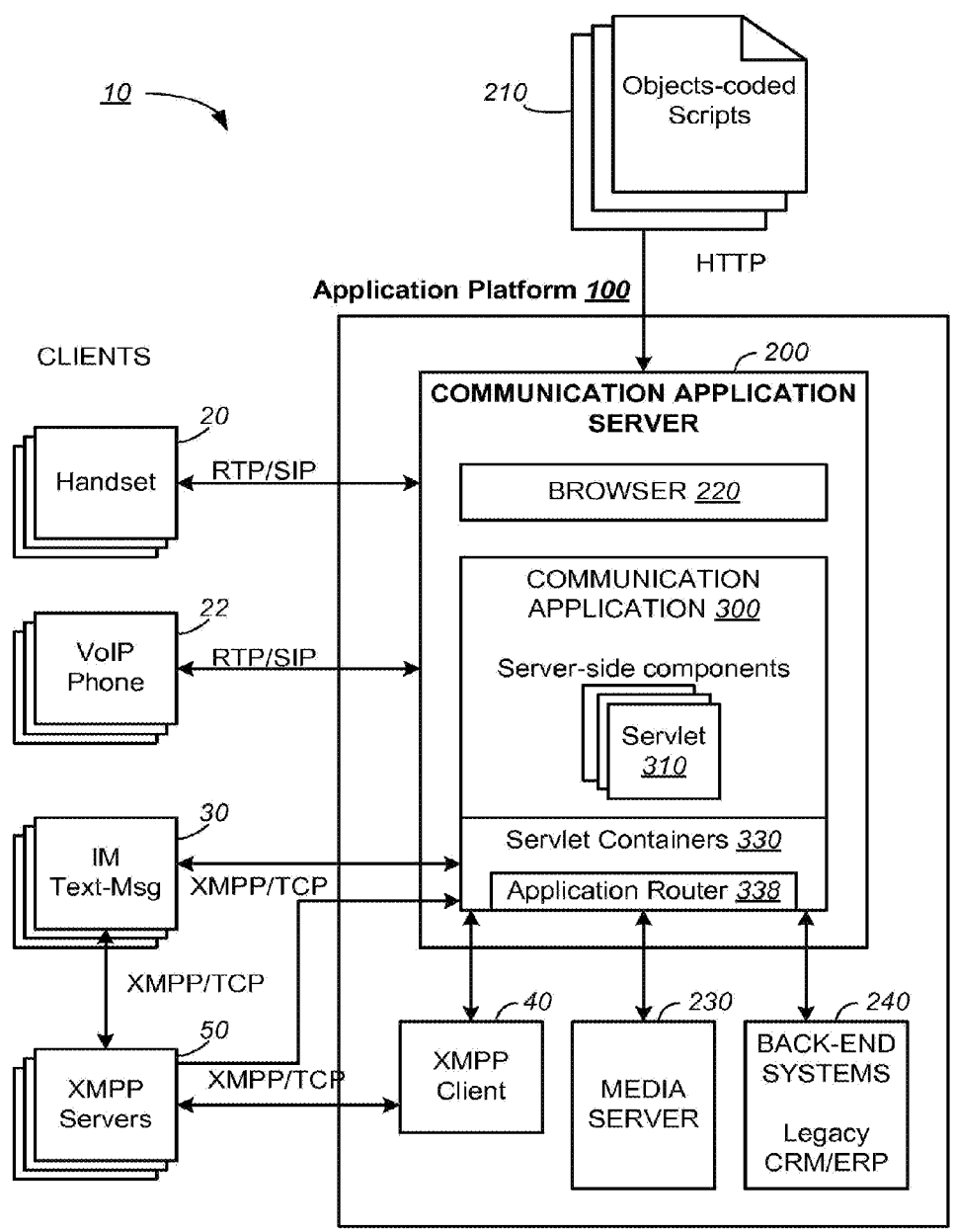
FIG. 1 illustrates schematically a communication application environment suitable for practicing the invention.

FIG. 1 illustrates schematically a communication application environment suitable for practicing the invention. The communication application environment 10 includes one or more client 20, 22, 30 interacting with a communication application server 200 in an application platform 100. The application platform 100 hosts an application specified by an application script 210 coded in object-oriented software. The communication application server 200 includes a browser 220 for interpreting and executing the application script 210. The execution of the application script 210 invokes one or more server-side components 310 in the application server 200. As will be described in more details later, the server-side components are preferably implemented as Servlets 310 that conform to the standards-based Java™ Servlet model. Among the clients and the communication server, these components 310 provide services for HTTP requests, call control and media control with one or more media server 230 and interactions with back-end systems 240 such as databases, and business logic and legacy systems such as CRM (Customer Relationship Management) and ERP (Enterprise Resource Planning). One example of the platform is to host an IVR application, which interacts with voice, text messaging and other clients in a multi-channel environment.

Text messaging has become very popular with the proliferation of portable phones and computing devices. Text messaging is a form of communication by exchange of text messages from point to point or point to multiple points. Most common forms of text messaging are email, web blog and instant messaging. Instant messaging ("IM") exchanges messages almost in real-time. There are a number of proprietary instant messaging networks, each providing IM service to each own clients using a native protocol. An open source IM Network also exists and uses the XMPP protocol.

XMPP refers to Extensible Messaging and Presence Protocol and it is a set of open XML technologies for presence and real-time communication developed by the Jabber open-source community in 1999.

FIG. 1 actually illustrates a multi-channel, self-help application platform. Essentially, a multi-channel, self-help application platform 100 hosts one or more self-help applications 300 for interactions with various clients via multiple channels. The different clients include voice clients 20, 22 where the mode of communication is via a voice channel. They also include text-messaging clients 30 where the mode of communication is via a text messaging channel. The communication application server 200, through a servlet container 330, interacts with IM clients 30 either directly or indirectly with an IM (XMPP) server 50 via an IM network. Additionally, an application router 338, which is implemented as a plug-in for servlet container 330, serves to route a client to an appropriate application.

Some actions in speech applications may find correspondence to text messaging applications. For example, playing an audio file is similar to sending a file over IM, recording a call is similar to recording a text messaging conversation, transferring a call is similar to setting up a chat (involving multiple IM users).

The text messaging clients 30 will interact with the self-help application hosted in the application platform 100 as if the self-help application is a web bot. A popular class of text messaging is Instant Messaging ("IM") where exchange of text messages between parties is almost in real-time. An open source IM client (OS) or (XMPP client) communicates with an open source network having an XMPP server. Examples of the various native IM networks are AOL Instant Messenger™, MSN Messenger™, Yahoo Messenger™, Lotus Sametime™, Google Talk™, and so forth.

Generally, each IM network operates under its own native protocol and they are not interoperable. Another class of IM networks is based on the open standard of XMPP as described earlier. A Jabber™ server provides IM service to its clients. Google Talk™ is another one that is based on the XMPP standard.

Preferably, XMPP server 50 is used as a bridge for the multi-channel, self-help application platform to interoperate with the various different IM networks. A transport module (not shown) is employed with XMPP server 50, which acts as a XMPP gateway to the various IM networks. To XMPP server 50, the multi-channel, self-help application platform 100 would just be another XMPP client 40. In this way, the various IM clients 30 are able to communicate with the multi-channel, self-help application platform 100 via the transports module and the XMPP server 50. When the IM client 30 is already part of the XMPP network, it will not need to be "transported" by the transports module, but simply talk directly with the XMPP server.

In the traditional web paradigm, a user agent in the form of a client machine running a web browser makes a request to a web server. The web server returns a response to the request. The communication is taking place under the HTTP (Hypertext Transfer Protocol). Specifically, the web browser requests a web resource such as a web page as specified by an URL from a web server. Typically the web server responds by returning the requested web page. The web page may contain text content with embedded instructions for the browser to render the text in the web page. In more sophisticated applications, a web page is often generated dynamically by employing server-side programs and may incorporate content as queried results from backend databases. Thus, some of the content are not hard-coded on the web page but are generated and rendered dynamically by the web server. The server-side programs may also serve to post data from the client to the backend databases.

Traditionally, these server-side programs are implemented as scripts conforming to the CGI protocol (Common Gateway Interface). The CGI scripts are code modules that perform the task on the web server to generate and render dynamic content or perform other backend functions.

However, CGI has several disadvantages. First, it is not very portable, as different web serving machines with different processors and operating systems may require their own versions of scripts. Secondly, it does not use the server resource efficiently. The different CGI scripts is are run in a different process context than the server which starts them. There is the overhead of creating a new process for each request and the different processes do not have access to a common set of server resources.

The Java™ Servlet model addresses the disadvantages of the CGI. Servlets are modules written in the highly portable Java™ programming language as they run in the same virtual JAVA machine, which is independent of the processor hardware or the operating system. In the objected-oriented Java™ programming language, the HTTP requests are parsed and made to interact with software objects modeled on the real objects that operate with the application. Similarly, the responses are made to conform with the HTTP protocol before being sent to the requester. Servlets run in a multi-threaded environment in the Java™ server and allow each request to be handled by a separate thread. Also, one instance of the Java™ scripts needs be loaded into the processor memory, as compared to CGI, where contemporaneous requests require multiple copies of the CGI scripts to be loaded. The original Servlets conform to the HTTP protocol and may be regarded as "HTTP Servlets". The Servlet model provides a set of APIs (Application Programming Interfaces) that is implemented by loading a corresponding Servlet container in the application server. The Servlet model enables developers to rapidly develop applications, to port them to different servers, and to be able to run them efficiently. It is widely used in web applications and is based on open standards.

The API is an abstraction that describes an interface for the interaction with a set of functions used by the components 310. It is a list containing the description of a set of functions that is included in a library and that addresses a specific problem. In the current context of Java™ object oriented languages, it comprises a description of a set of Java™ class definitions and extension class definitions with a set of behaviors associated with the classes. The API can be conceived as the totality of all the methods publicly exposed by the classes (the class interface). This means that the API prescribes the methods by which one handles the objects derived from the class definitions.

For call control, a number of protocol standards have been put forward for interoperability. For example, the H.323 standard is a protocol standard recommended by the ITU (International Telecommunication Union) for signaling and call control of IP telephony.

An increasingly popular alternative to the H.323 standard for call control is SIP ("Session Initiation Protocol".) SIP is an IETF (Internet Engineering Task Force) protocol for signaling and call control of IP telephony and multimedia communication between two or more endpoints. It is text-based and more web-centric and is a comparatively simpler and more lightweight alternative to H.323.

For call control, a SIP Servlet has been developed and established as a standard to handle requests under the SIP protocol, just as the HTTP Servlet handles requests under the HTTP protocol.

The SIP Servlet Specification (JSR 289) is a container-based approach (modeled on the HTTP Servlet paradigm) to developing communication applications utilizing the Session Initiation Protocol (SIP) protocol. A SIP Servlet is a Java™ programming language server-side component that performs SIP signaling. SIP Servlets are managed by a SIP Servlet container, which typically is part of a SIP-enabled application server. SIP Servlets interact with clients by responding to incoming SIP requests and returning corresponding SIP responses. SIP Servlets are built of the generic Servlet API provided by the Java™ Servlet Specification, which is established as an open standard by the Java Community Process (SM) Program through the Java Specification Request (JSR) process.

Using a SIP Servlet (JSR 289) for call control leverages the benefits of the Servlet model. Thus, an application developer can develop components of a communication application in terms of low level call control objects and API in the form of HTTP Servlets and SIP Servlet based on the open standards JSR 289.

It is therefore desirable to be able to provide a set of API based on the Servlet model that operates with the XMPP protocol.

The existing Java™ Servlet model, such as HTTP Servlet and SIP Servlet are predicated on the request-response model. In the HTTP case, the interactions are synchronous. In the SIP case, the interactions are asynchronous. While the HTTP Servlet is basically stateless, the SIP Servlet has to maintain state in a session.

In XMPP case, IM messages are exchanged and there is no inherent concept of request-response. The interactions are essentially asynchronous, although the handshaking interactions may be synchronous. Similarly, IM is basically stateless. However, when employing an IM client to interact with a self-help application, state needs be maintained. Thus a XMPP servlet specification has to overcome these differences.

XMPP Servlet and API

The Extensible Messaging and Presence Protocol (XMPP) is an open Extensible Markup Language (XML) protocol for near-real-time messaging, presence, and request-response services. The core features of XMPP are defined in Extensible Messaging and Presence Protocol: Core [RFC3920], which is maintained by the XMPP Standards Foundation (formerly the Jabber Software Foundation). The core features include XMPP specific features such as XML streams, use of TLS and SASL, and the <message/>, <presence/>, and <IQ/> children of the stream root. These features provide the building blocks for many types of near-real-time applications, e.g. an instant messaging (IM) and presence application defined in Core [RFC3921].

An important aspect of any communication infrastructure is programmability and the purpose of the XMPP servlet API is to standardize the platform for delivering XMPP-based services. The term platform is used here to include the Java™ API itself as well as standards covering the packaging and deployment of applications. The platform mainly provides the core XMPP features defined in [RFC3920] and infrastructure functions, so XMPP applications, e.g. XMPP IM applications, can be built on the platform easily.

The XMPP Servlet API is able to provide the following advantages:

XMPP functions: It allows applications to perform a fairly complete set of XMPP functions, including stream features negotiation, SASL (Simple Authentication and Security Layer) functions, stanza receiving and delivering.

Simplicity: Containers handle "non-essential" complexity such as managing network listen points, connection management, stanza routing, stream feature negotiations, etc., so applications can focus on their application-specific rules.

Converged applications: It is possible for containers to support converged applications (that is, applications that span multiple protocols and interfaces), for example, Web, IM, SIP and other Java EE interfaces.

Third party application development: The Servlet model supports third party application development. An XML deployment descriptor is used to communicate application information from application developers to deployers.

Carrier grade: Servlets store application data in container managed session objects. Implementations may persist and/or replicate this data to achieve high availability.

A XMPP Servlet is a Java™-based application component that is managed by a XMPP Servlet container, just as a HTTP Servlet is managed by a HTTP container. A XMPP Servlet performs XMPP application functions, for example, a XMPP Servlet behaves as a XMPP IM application. A XMPP Servlet is responsible for XMPP stanza processing according to application rules (for example, processing the initial presence stanza by sending probe presence stanza and broadcasting presence stanza). A XMPP Servlet can also control the stream negotiation process by interacting with the container through the XMPP Servlet APL. Like other Java™-based components, Servlets are platform-independent Java™ classes that are compiled to platform-neutral bytecode that can be loaded dynamically into and run by a Java™-enabled XMPP application server. Containers, sometimes called Servlet engines, are server extensions that provide Servlet functionality. XMPP Servlets interact with XMPP clients or other XMPP servers by exchanging stanzas through the Servlet container.

The Servlet container is a part of an application server that provides the network services over which requests and responses are received and sent. It decides which applications to invoke. A Servlet container also contains and manages Servlets through their lifecycle. A XMPP Servlet container is responsible for managing the connection and the XMPP stream upon the connection with other XMPP entities, and the container receives the incoming stanza, dispatch the stanza to the appropriate Servlet, and accepts the outgoing stanza from the application and routes them it to the appropriate XMPP entity. Servlet containers can be built into or possibly installed into Servlet-enabled application servers. A XMPP Servlet container manages the network listen points on which it listens for incoming XMPP traffic (a listen point being a combination of transport protocol, IP address and port number). A Servlet container may place security restrictions on the environment in which a Servlet executes. In a Java™ 5 Platform Standard Edition (J2SE 5.0) or Java™ Platform, Enterprise Edition 5 (Java™ EE 5) environment, these restrictions should be placed using the permission architecture defined by the Java™ platform. For example, high-end application servers may limit the creation of a Thread object, to ensure that other components of the container are not negatively impacted.

Figure 2:
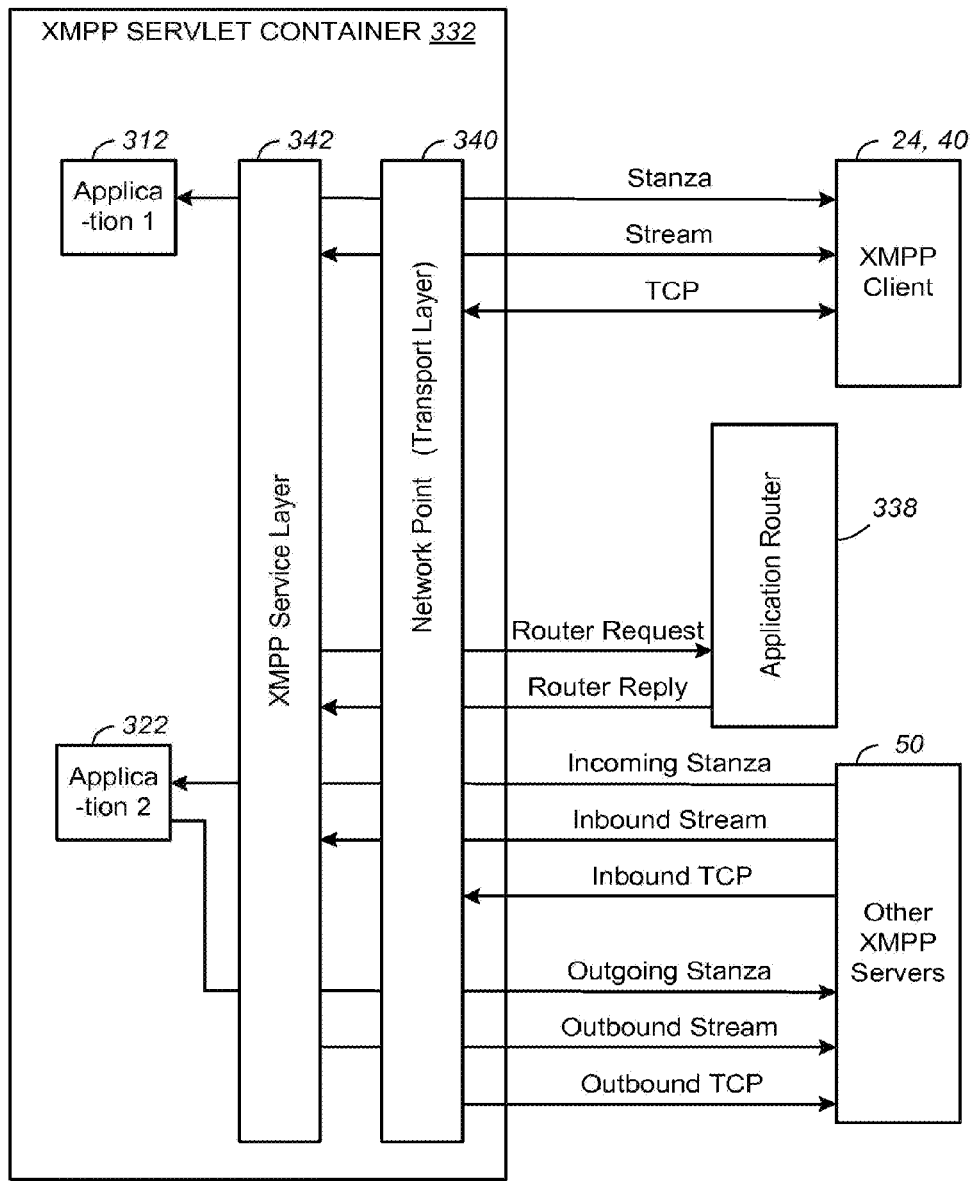
FIG. 2 illustrates a system architecture for the XMPP Servlet model.

FIG. 2 illustrates a system architecture for the XMPP Servlet model. The overall system includes XMPP clients 24, 40 interacting with the application server 200 (container 330+application 300) and other XMPP servers 50 as shown in FIG. 1. The implementation of the XMPP Servlet model is to implement the XMPP Servlet container 332, which is one of the servlet containers 330. The XMPP Servlet container 332 can communicate with other XMPP entities, including XMPP client 40 and other XMPP servers 50, over XMPP protocol (see also FIG. 1).

There are three levels of communication from the XMPP Servlet container point of view. The first level is transport layer 340. In the preferred embodiment, TCP is employed as the transport protocol. The network point component in transport layer accepts incoming TCP connection from XMPP client 24, 40 or other XMPP servers 50 and creates outgoing TCP connection to XMPP client 24, 40 or other XMPP servers 50. The network point component maintains these connections and transfers the incoming data and necessary information to the higher level, and also receives outgoing data from the higher level and sends it out.

The second level is the stream level where XMPP streams are handled in an XMPP Service Layer 342. The stream concept in [RFC3920] is mapped to XmppSession interface in the XMPP Servlet API, so this level is really responsible for maintaining XmppSession information and providing the session information to higher level.

As shown in FIG. 1, application router 338 is a plug-in for XMPP Servlet container 332. During initial connection negotiation, container 332 receives <stream> open tag requests from a client or other entities and processes it at XMPP Service Layer 342, which then sends a query to the application router 338 as to which application to select. The application router 338 returns a reply with an application selection based on a routing table or predefined rules. The XMPP Service Layer 342 then invokes the selected application and establishes the connection.

The third level is the stanza level where XMPP stanzas are handled. At the stanza level, stanzas come into and go out from applications 312, 322. Stanzas are actually wrapped in Servlet request and response pairs, so applications can also get the XMPP Session or connection information from the request or response, in addition to the stanza information.

The architecture of the Java XMPP servlet container is such that the negotiation of streams terminates at the XMPP service layer and not at the application layer. This allows portability of the applications from one server to another server within a cloud of computing resources.

Figure 3:
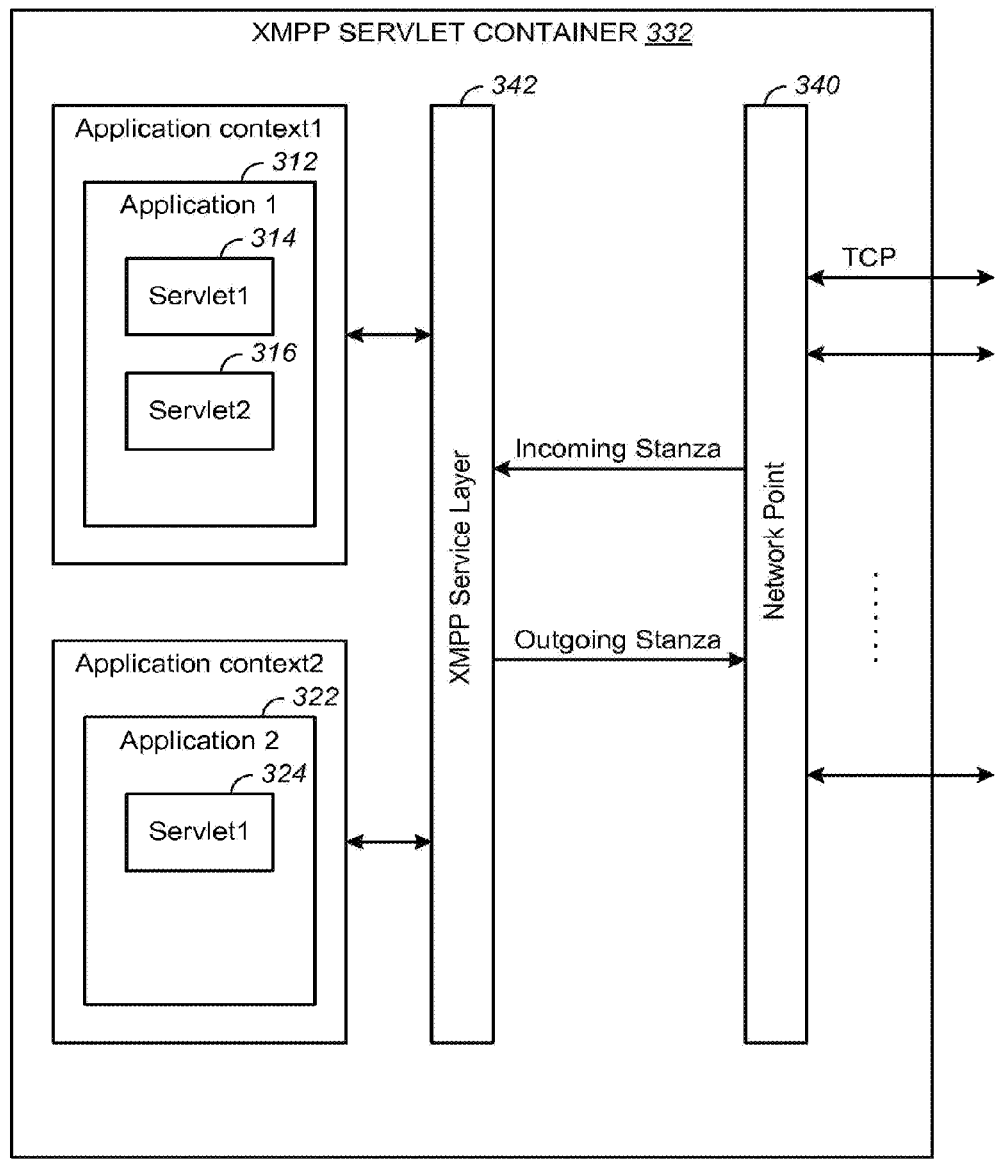
FIG. 3 illustrates the overall application architecture for the XMPP Servlet model.

FIG. 3 illustrates the overall application architecture for the XMPP Servlet model. The XMPP Servlet container 332 manages applications and Servlets. More than one application 312, 322 can be deployed to the container 322, and one application 312 may contain more than one Servlet 314, 316. However, there is only one MAIN Servlet in one application. The container manages the lifecycle of all Servlets in one application, but it dispatches the incoming request only to the MAIN Servlet, and then the MAIN Servlet can dispatch the request to other Servlets by the application's own business rules. Every application must have a deployment descriptor when it is deployed, the descriptor describe the application's properties and Servlets to be loaded. By reading the descriptor the container know how to initialize the application and which Servlets to load and how to configure them.

As also described in connection with FIG. 2, the XMPP Servlet container 302 maintains all network connections at the network point 340, and maintains the XMPP stream information at XMPP service layer 342.

An example of IM presence is given below. In a XMPP IM application defined in RFC3921, after establishing a session, a client sends initial presence to the server in order to signal its availability for communications. The steps performed by the application and container are as follows:

1) After stream negotiation, a session is established between the client and the server.
2) The client sends a presence stanza to the server.
3) The container receives the presence stanza from the listening network end point.
4) The container validates the stanza by parsing it using XML parser, after validating that it as a valid XML element. The container validates the presence stanza according to the XMPP core protocol (RFC3920); for example, by validating that the from attribute is the one that has been authenticated in the stream negotiation process.
5) After validation of the stanza, the container looks for the appropriate Servlet that should be invoked and then invokes it with the presence stanza wrapped in a Servlet request.
6) The Servlet receives the validated presence stanza from the container, and processes it according to the IM application; for example, by sending probe presence stanza to contacts for which a JID is present in the user's roster with the 'subscription' attribute set to a value of "to" or "both", broadcasting the presence stanza to contacts for which a JID is present in the user's roster with the 'subscription' attribute set to a value of "from" or "both".
7) The container accepts the stanza sent by the Servlet and routes it to the appropriate entity according to the server rules for routing stanzas which is defined in the XMPP core protocol.

The Servlet Interface

Figure 4:
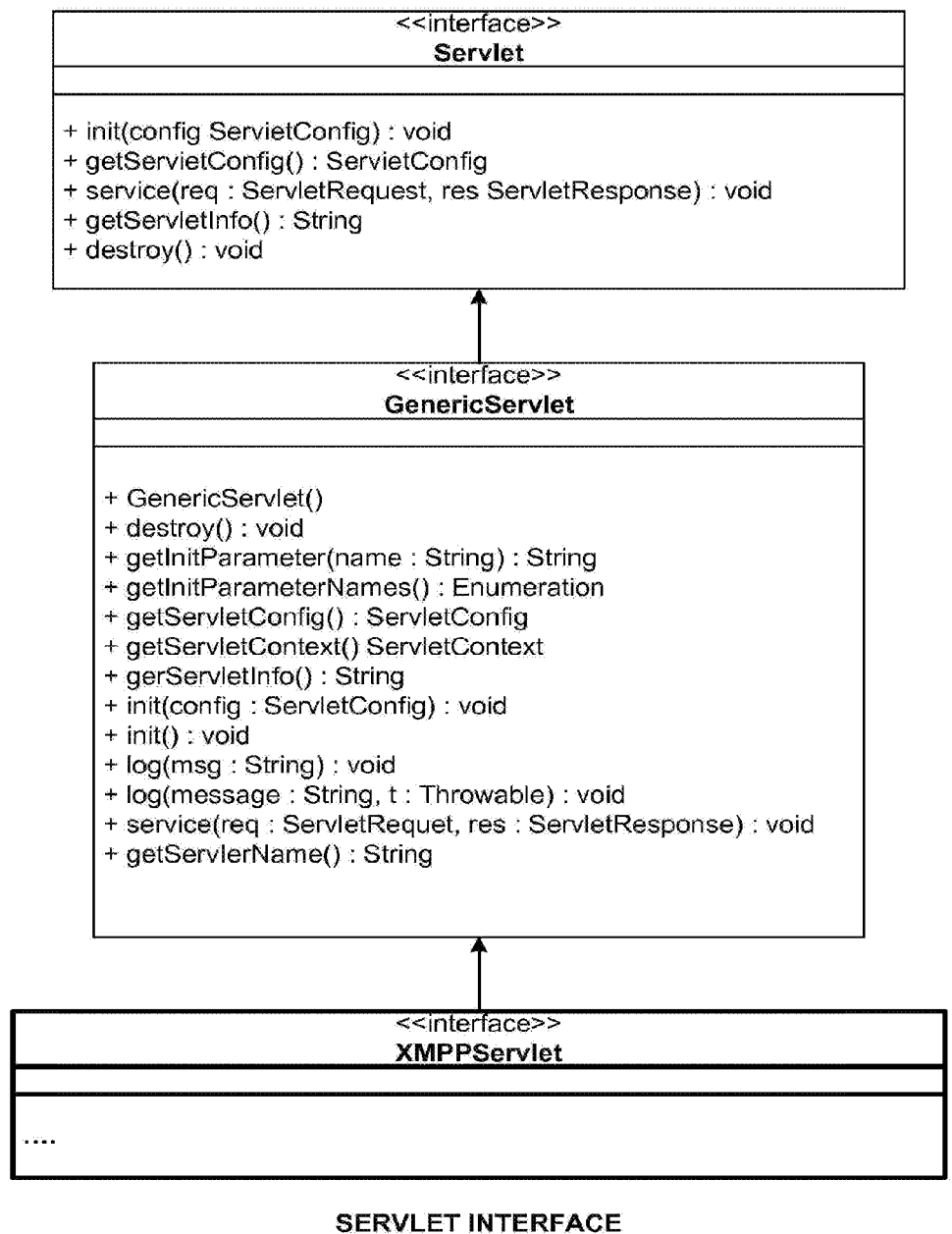
FIG. 4 illustrates the inheritance of the XMPP Servlet Interface.

FIG. 4 illustrates the inheritance of the XMPP Servlet Interface. The Servlet interface is the central abstraction of the Servlet API and hence of the XMPP Servlet API. All Servlets implement this interface either directly or, more commonly, by extending a class that implements the interface. The generic Servlet API defines a class GenericServlet that is an implementation of the Servlet interface. The XMPP Servlet API defines a class XmppServlet that extends the GenericServlet interface and performs dispatching based on the type of message received. For most purposes, developers will extend XmppServlet to implement their Servlets.

FIG. 5 illustrates in more detail the XMPP Servlet Interface shown in FIG. 4.

Object Model for XMPP Messages

XMPP Messages are handled by the Servlet container. The basic Servlet interface defines a service method for handling client requests. This method is called for each message that the Servlet container routes to an instance of a Servlet. The handling of concurrent messages in a Servlet application generally requires the developer to design Servlets that can deal with multiple threads executing within the service method at a particular time. Generally, the Servlet container handles concurrent requests to the same Servlet by concurrent execution of the service method on different threads. XMPP Servlets are invoked to handle all incoming stanzas. In either case, the stanza is wrapped in a ServletRequest message or a ServletResponse message and delivered through the service method of the Servlet interface:

void service(ServletRequest req, ServletResponse res)
    throws ServletException, java.io.IOException;

If the message is a request the response argument MUST be null, and if the message is a response, the request argument MUST be null. When invoked to process a XMPP event, the arguments must implement the corresponding interfaces as the case may be. For example, if it is an IQ set stanza it must implement the IQRequest interface, and if it is a IQ result stanza it must implement the IQResponse interface. The XmppServlet implementation of the service method dispatches incoming messages to a method doRequest for requests and a method doResponse for responses, respectively:

Protected void doRequest(XmppServletRequest req);
Protected void doResponse(XmppServletResponse resp);

These methods then dispatch further as described in the following Table 1 and Table 2.

The XMPP Servlet abstract subclass defines a number of methods beyond what is available in the basic Servlet interface. These methods are automatically called by the doRequest method (and indirectly from service) in the class to aid in processing XMPP based requests.

Table 1 lists the methods for request handling of the XMPP Servlet:

TABLE 1

XMPP Specific Request Handling Methods

| INTERFACE | DESCRIPTION |
| --- | --- |
| void doIQRequest(IQRequest req) | for handling IQ set or get stanza |
| void doMessage(InstantMessage req) | for handling message stanza |
| void doPresence(PressenceMessage req) | For handling presence stanza |

The three methods are for stanza processing. Applications usually implement these three methods to process the corresponding stanza; for example, an IM application may implement the doMessage method for message exchanging.

The doResponse method dispatches the received response to the following method. There is only one method for IQ result or error stanza. Applications need to implement this method when they want to process IQ result or error stanza.

Table 2 lists the method for response handling of the XMPP Servlet:

TABLE 2

XMPP Specific Response Handling Methods

| INTERFACE | DESCRIPTION |
|---|---|
| protected void doIQResponse (IQResponse resp) | for handling IQ result or error stanza |

XMPP Concept Interfaces

In the XMPP Servlet API, some XMPP concepts are mapped to a Java™ interface.

The JID interface represents the JID of any entity, corresponding to the JID conception in XMPP core. JID is a class and is an XMPP address.

Request and Response

Figure 6:
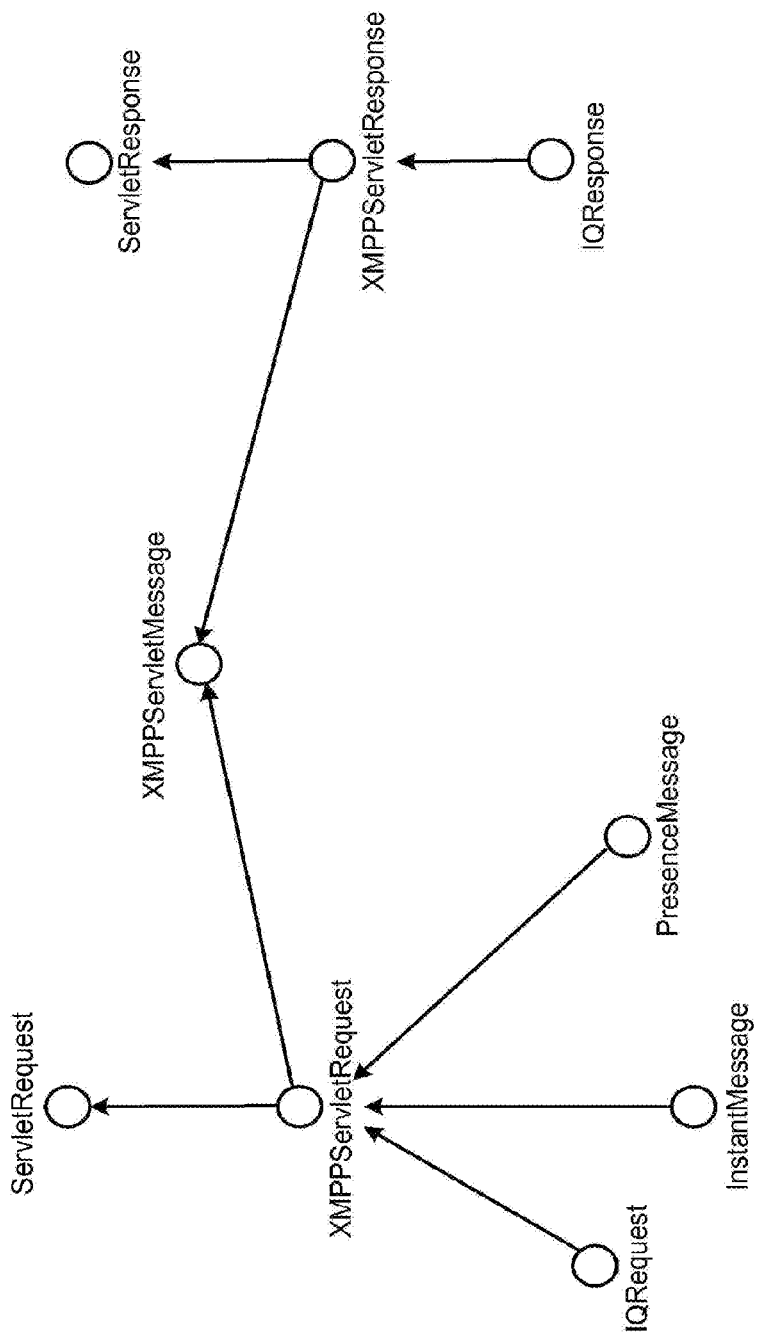
FIG. 6 illustrates the structure of XMPP Servlet, showing the overall inheritance architecture of the XMPP Servlet request and response objects.

FIG. 6 illustrates the structure of XMPP Servlet, showing the overall inheritance architecture of the XMPP Servlet request and response objects.

Requests and responses are objects exchanged between the container and Servlets. When the container received an incoming XML element, it encapsulates it in a request or response with other necessary information (e.g., the XmppSession object the stanza belongs to), and then transfers the request or response to the appropriate Servlet by the Servlet interface. Requests and responses are really wrapped stanza or XML element transferring over a stream.

In order to fit in the Servlet model, all request interfaces extend the ServletRequest interface, and all response interfaces extend the ServetResponse interface. Apart from the inherited methods, these request and response interfaces have only a few their own methods; these methods are:

XmppSession getSession( ) for getting the XmppSession this XmppServletResponse belong to; void send( ) for sending out this request or response as XML element.

Sessions

XMPP applications typically must process multiple messages in order to provide the intended service. As Servlets themselves are stateless, the API provides a mechanism that allows messages to be correlated and specify how containers associate application data with subsequent messages processed in an "application instance". The HTTP Servlet API provides such a mechanism in the form of HTTP sessions. The HttpSession interface allows Servlets to correlate a series of HTTP requests from a particular client and also acts as a store for application data.

The XmppSession interface is the XMPP Servlet API equivalent of HttpSession. It represents a point-to-point relationship between two entities. However, we need converged applications to communicate with other network elements using multiple protocols, for example SIP, HTTP, email, etc. Application composition allows for many applications to be active together. This implies that there may be more than one application invoked on a single call; that any one application instance may consist of multiple point-to-point relationships; and that these relationships may employ different protocols. This is reflected in the XMPP Servlet API through the notions of protocol sessions and application sessions. A protocol session is a protocol specific session object typically representing a point-to-point relationship. The XmppSession, HttpSession, and SipSession interfaces are examples of protocol sessions. An application session in a sense represents an application instance. It contains a number of protocol sessions and is also used as a container for application data. All protocol sessions belonging to the same application instance belong to the same SipApplicationSession; this name is inherited from the SIP specification [JSR289]. Containers may, as an optimization, create application session and XMPP session objects lazily, for example by postponing creation until requested by the application. The result should be indistinguishable from an implementation that always creates the session objects.

The underlying TCP connection and XMPP stream [RFC 3920] are modeled as XmppConnection instances. XmppSession is only loosely coupled with XmppConnection. This allows XmppSession to be replicated among different nodes within a cluster of servers with the knowledge of the underlying network connection and stream negotiation. Such replication provides load balance and fail over capability for a set of clustered Xmpp Servlet Containers.

Container Functions

One of the goals of the XMPP Servlet API is to keep the application programming model simple. This is accomplished by delegating a number of tasks to the container and freeing up the applications to focus on their business logic. Tasks such as management of network listen points, TLS negotiation, and XMPP XML element parsing are handled by the containers. Speaking overall, containers accomplish the following tasks:

1) Provide basic server functions, like management of network listen points.
2) Provide functions that are specified in XMPP core [RFC3920], like TLS negotiation, and SASL negotiation if application is configured to use container-managed security, and resource binding, XML parsing.
3) Provide the API implementation. Applications accomplish the application specific tasks that are specified in XMPP extension protocols, like the XMPP Instant Messaging and Presence protocol [RFC3921], by using the XMPP Servlet API to interact with containers. Applications can also fully control some functions specified in XMPP core using the XMPP Servlet APL For example, applications can accomplish the SASL negotiation by itself using the XMPP Servlet API if they do not use container-managed security. As a thumb rule, functionality that is "behind" the XMPP Servlet API is managed by the container. As an example, the API exposes the XmppSession interface and allows applications to perform operations like creation of a request, getting and setting attributes, invalidation, and so forth on the XmppSession but it does not allow the application to create a new XmppSession explicitly. The XmppSession is an object managed by the container and is created as a result of incoming request processing or creation of a new request by the application. The API strives to strike a balance between the ability to write simple XMPP Servlet applications but at the same time allowing for powerful constructs using the base APL Application Selection and Servlet Selection An important function of XMPP Servlet application servers is to select applications for invocation and route XMPP messages to them. The application selection and Servlet selection policy in XMPP Servlet container is similar with the SIP Servlet API [JSR289]. A key component of the XMPP application selection procedure is the application router 338, which is a logical entity shown in FIG. 1 and FIG. 2. Application router 338 is called by the container to select a XMPP Servlet application to service an initial request. It embodies the logic used to choose which applications to invoke. An application router 338 is required for a container to function, but it is a separate logical entity from the container. Application router 338 is solely responsible for application selection and must not implement application logic.

The container receives <stream> open tag requests from other entities, calls application router 338 to obtain the application to invoke, and then invokes the selected application. A common application router 338 will check the to attribute in the <stream> open tag, and select the appropriate application based on the value of the to attribute. Initial requests are routed based on an application selection process. The routing of an <stream> open tag request establishes a path of applications. Subsequent requests and responses are then routed along the path taken by the initial request.

Each application is responsible for Servlet selection. As mentioned in application architecture, every application has a MAIN Servlet. The container dispatches all the incoming request only to the MAIN Servlet, and then the MAIN Servlet dispatches the request to other Servlets in the application by the application's own business rules.

Stream Features

In the XMPP protocol, when a server accepts a TCP connection and receives a <stream> open tag for initiating a XMPP stream, the server responds by opening a TCP connection and sending an XML stream header to the initiating entity, and then advertises supported features by sending the <features> XML element. In the XMPP Servlet API, the three features, TLS, SASL and resource binding that are described in XMPP core [RFC3920] must be configured in the deployment descriptor. If the application needs any of the three features, it can configure it in the deployment descriptor, then the container will advertise these features to the initiating entity when received a stream request. If the application needs other application specific features, it must do the following things: 1) configure a XmppConnectionListener in the deployment descriptor to receive XmppConnectionEvent which is triggered by the stream open request of the initiating entity; 2) implement the onStream(XmppConnectionEvent event) in the XmppConnectionListener; and 3) return the application specific feature in this method.

TLS Negotiation

The TLS negotiation is accomplished by container; the only thing that needs applications do is to configure it in the deployment descriptor.

SASL Negotiation

Applications can configure to use container-managed security in the deployment descriptor, so the container can accomplish all the SASL negotiation by using the configured information. Applications can also process the SASL negotiation by registering their own SASL mechanism provider and selecting another mechanism during SASL negotiation.

Table 3 lists the methods to register and unregister SASL mechanism provider m XmppFactory:

TABLE 3

Methods for selecting SASL mechanism

| INTERFACE | DESCRIPTION |
| --- | --- |
| void addSASLProvider (java.security.Provider provider) | Add your own security provider; you can provide your own SASL mechanism in the provider and then you can select your own mechanism during SASL negotiation when initiating a sream request by using the method in XmppConnectionListener. |
| onAuthentication (List<MechanismFeature> mechanisms) | Called when the initiating party receives a <feature> with authentication mechanisms, return the SASL mechanism you select. Or you can provide your own SASL mechanism when receiving a stream request in the following method in XmppConnectionListener |
| onStream (XmppConnectionEvent event) | Called when the receiving party receives a <stream> after authentication, so you can provide your own feature to remote party here. |

Once the XmppConnectionListener selects the mechanism, the container will complete the authentication based on the mechanism selected by the XmppConnectionListener.

Resource Binding

The resource identifier of JID is used to identify a specific session with a client, and the container is responsible for maintaining session information, so the container itself must accomplish the resource binding process. When an application needs resource binding functionality, it only needs to configure the requirement in the deployment descriptor. When the container finds the resource binding configuration, it will accomplish the resource binding process by itself and set the negotiated resource identifier in the XmppSession object.

Deployment Descriptor

The following is a snippet of a deployment descriptor instance. This snippet illustrates the main different part of XMPP deployment descriptor with SIP and HTTP deployment descriptor. There are three parts in the snippet. The client-login-config part configures the policy when the container accepts connections from a client. The server-login-config element configures the policy when the container accepts connections from other XMPP server. The login-to-other-server-config element configures the policy when the container initiates connections to other XMPP server. In every part there are four elements. The appProcessStream element is used to configure whether the application wants to receive the <stream> open tag request and which <stream> request to receive (any of the three types), the RAW <stream> request, the <stream> request received after TLS negotiation, the <stream> request received after SASL negotiation. The TLS-configure element is used to configure the TLS requirement level. The SASL-mechanism is used to configure the SASL mechanism. The resource binding element is used to configure if resource binding is required.

```
<xmpp.client-login-config>
    <xmpp.appProcessStream>SASLED</xmpp:appProcessStream>
```

```
    <xmpp.TLS-configure>SUPPORTED</xmpp:TLS-configure>
    <xmpp. SASL-configure>
        <xmpp. SASL-mechanism>
            <xmpp.auth-method>DIGEST-MD5</xmpp:auth-method>
            <xmpp.realm-name>realm-nameO</xmpp.realm-name>
            <xmpp.NeedSecureTransport>FALSE</xmpp :NeedSecureTransport>
        </xmpp: SASL-mechanism>
        <xmpp. SASL-mechanism>
            <xmpp.auth-method>EXTERNAL</xmpp:auth-method>
            <xmpp.realm-name>realm-name1<xmpp.realm-name>
            <xmpp.NeedSecureTransport> TRUE</xmpp:NeedSecureTransport>
        </xmpp: SASL-mechanism>
    </xmpp: SASL-configure>
    <xmpp.resourcebinding/>
</xmpp:client-login-config>
<xmpp.server-login-config>
    <xmpp.TLS-configure>REQUIRED</xmpp:TLS-configure> <xmpp. SASL-configure>
    <xmpp. SASL-configure>
        <xmpp. SASL-mechanism>
            <xmpp.auth-method>DIGEST-MD5</xmpp:auth-method>
            <xmpp.realm-name>realm-nameO</xmpp.realm-name>
            <xmpp.NeedSecureTransport>FALSE</xmpp:NeedSecureTransport>
        </xmpp: SASL-mechanism>
        <xmpp. SASL-mechanism>
            <xmpp.auth-method>EXTERNAL</xmpp:auth-method>
            <xmpp.realm-name>realm-name1<xmpp.realm-name>
            <xmpp.NeedSecureTransport> TRUE</xmpp:NeedSecureTransport>
        </xmpp: SASL-mechanism>
    </xmpp: SASL-configure>
</xmpp:loginto-otherserver-config>
<xmpp.loginto-otherserver-config>
    <xmpp.TLS-configure>REQUIRED</xmpp:TLS-configure>
    <xmpp. SASL-configure>
        <xmpp. SASL-mechanism>
            <xmpp.auth-method>DIGEST-MD5</xmpp:auth-method>
            <xmpp.realm-name>realm-nameO</xmpp.realm-name>
            <xmpp.NeedSecureTransport>FALSE</xmpp :NeedSecureTransport>
        </xmpp: SASL-mechanism>
        <xmpp. SASL-mechanism>
            <xmpp.auth-method>EXTERNAL</xmpp:auth-method>
            <xmpp.realm-name>realm-name1</xmpp.realm-name>
            <xmpp.NeedSecureTransport> TRUE</xmpp:NeedSecureTransport>
        </xmpp: SASL-mechanism>
    </xmpp:SASL-configure>
</xmpp:loginto-otherserver-config>
```

While the embodiments of this invention that have been described are the preferred implementations, those skilled in the art will understand that variations thereof may also be possible. Therefore, the invention is entitled to protection within the full scope of the appended claims.

What is claimed is:

1. A server, comprising:
a computer comprising at least a memory and a processor and further comprising programmable instructions stored in the memory and operating on the processor, the instructions adapted to implement a servlet Application Programming Interface (API) for Extensible Messaging and Presence Protocol (XMPP) and executing on a virtual machine for servicing an XMPP entity; and
an XMPP servlet container supporting the servlet API for XMPP for handling network transport, streams and stanzas specific to the XMPP entity;
wherein the API provides a mechanism that allows messages to be correlated to specify how containers associate application data with subsequent messages processed in an application instance;
wherein the XMPP servlet container further comprises:
a network point at a transport layer for listening, routing and managing network connections with the XMPP entity;
an XMPP service layer for managing XMPP sessions and streams with the XMPP entity via the network point;
an application layer for managing XMPP stanzas with the XMPP entity via the XMPP service layer; and
an application router to select an XMPP servlet application;
wherein the application router services an initial request; and
wherein the initial request contains an attribute and the application router selects an appropriate application based on the value of the attribute.

2. The server as in claim 1, wherein:
the XMPP servlet container performs basic functions including management of network listen points; XMPP Transport Layer Security (TLS) negotiation and Simple Authentication and Security Layer (SASL) negotiation when the application is configured to use container-managed security; resource binding; and XML parsing.

3. The server as in claim 1, wherein:
the XMPP servlet API defines a class that extends a generic servlet API; and
the generic servlet API defines a generic class that provides an API to generic features of a standards-based servlet model.

4. The server as in claim 3, wherein:
the generic servlet API defines a service method for handling client requests;
the service method is called for each message that the XMPP servlet container routes to an instance of a servlet; and
an XMPP stanza being handled by an XMPP servlet is wrapped in a message delivered through the service method.

5. The server as in claim 1, wherein:
the XMPP servlet API defines different interfaces specific to handling different types of XMPP streams including handling stream open tag, steam close tag, stream error xml element, and stream features xml element.

6. The server as in claim 1, wherein:
the XMPP servlet API defines different interfaces specific to handling different types of XMPP stanzas including presence stanza, IQ set stanza, and message stanza.

7. The server as in claim 1, wherein:
the XMPP servlet API defines different interfaces specific to handling different types of XMPP Simple Authentication and Security Layer (SASL) negotiations including SASL authorization request, SASL challenge, SASL response, SASL abort, SASL failure and SASL success.

8. The server as in claim 1, wherein:
the XMPP servlet API defines an interface for handling XMPP IQ result or error stanza.

9. A method of operating a server, comprising:
deploying an application on a server comprising at least a memory and a processor and further comprising programmable instructions stored in the memory and operating on the processor, the instructions adapted to implement a servlet Application Programming Interface (API) for Extensible Messaging and Presence Protocol (XMPP);
providing an XMPP servlet container supporting the servlet API for XMPP for handling network transport, streams and stanzas specific to the XMPP;
the XMPP servlet container further comprising:
a network end point at a transport layer for listening, routing and managing network connections with an XMPP entity;
an XMPP service layer for managing XMPP sessions and streams with the XMPP entity via the network end point; and
an application layer for managing XMPP stanzas with the XMPP entity via the XMPP service layer;
executing an application on a virtual machine on the server for servicing the XMPP entity;
wherein:
a session is established at the server from a client;
the client sends a presence stanza to the server;
the XMPP servlet container receives the presence stanza from the network end point;
the XMPP servlet container validates the presence stanza according to an XMPP core protocol;
the XMPP servlet container invokes an appropriate Servlet with the presence stanza wrapped in a Servlet request;
the Servlet receives the validated presence stanza from the XMPP servlet container, and process it according to the application;
the XMPP servlet container accepts the stanza sent by the Servlet and routes them to an appropriate entity according to server rules for routing stanzas which is defined in the XMPP core protocol; and,
providing an application router that selects an XMPP servlet application to service an initial request that contains an attribute and the application router selects an appropriate application based on a value of the attribute.

10. The method as in claim 9, wherein:
the XMPP servlet container performs basic functions including:
management of network listen points;
XMPP Transport Layer Security (TLS) negotiation and Simple Authentication and Security Layer (SASL) negotiation when the application is configured to use container-managed security;
resource binding, and
XML parsing.

11. The method as in claim 9, wherein:
the XMPP servlet API defines a class that extends a generic servlet API; and
the generic servlet API defines a generic class that provides an API to generic features of a standards-based servlet model.

12. The method as in claim 9, wherein:
the generic servlet API defines a service method for handling client requests;
the service method is called for each message that the servlet container routes to an instance of a servlet; and
wrapping an XMPP stanza being handled by an XMPP servlet in a message for delivery through the service method.

13. The method as in claim 9, wherein:
the XMPP servlet API defines different interfaces specific to handling different types of XMPP streams including handling stream open tag, steam close tag, stream error xml element, and stream features xml element.

14. The method as in claim 9, wherein:
the XMPP servlet API defines different interfaces specific to handling different types of XMPP stanzas including presence stanza, IQ set stanza, and message stanza.

15. The method as in claim 9, wherein:
the XMPP servlet Application Programming Interface (API) defines different interfaces specific to handling different types of XMPP SASL negotiations including SASL authorization request, SASL challenge, SASL response, SASL abort, SASL failure and SASL success.

16. The method as in claim 9, wherein:
the XMPP servlet API defines an interface for handling XMPP IQ result or error stanza.

\* \* \* \* \*